United States Patent [19]

Yoneda et al.

[11] Patent Number: 5,060,164
[45] Date of Patent: Oct. 22, 1991

[54] NUMERICAL CONTROLLER FOR MACHINING A NON-CIRCULAR WORKPIECE AND CAPABLE OF CALCULATING PROFILE DATA

[75] Inventors: Takao Yoneda, Nagoya; Naoki Arimoto, Takahama; Toshihiro Yonezu, Nishio, all of Japan

[73] Assignee: Toyoda Koki Kabushiki Kaisha, Kariya, Japan

[21] Appl. No.: 383,528

[22] Filed: Jul. 24, 1989

[30] Foreign Application Priority Data

Jul. 26, 1988 [JP] Japan .................. 63-186459

[51] Int. Cl.⁵ .............................. G06F 15/46
[52] U.S. Cl. .................. 364/474.29; 364/474.06
[58] Field of Search .......... 364/474.29, 474.06; 51/165.87, 165.88, 165.71, 105 EC, 101 R; 318/572

[56] References Cited

U.S. PATENT DOCUMENTS

| | | |
|---|---|---|
| 3,344,559 | 10/1967 | Inaba et al. |
| 3,482,357 | 12/1969 | Inaba et al. ................... 51/101 |
| 3,917,930 | 11/1975 | Davey et al. ................ 235/151.11 |
| 4,084,243 | 4/1978 | Kishi et al. ................. 364/474.06 |
| 4,206,393 | 6/1980 | Chiba . |
| 4,214,309 | 7/1980 | Koide et al. ............. 364/474.06 X |
| 4,293,913 | 10/1981 | Nishimura et al. ........ 51/165.71 X |
| 4,484,413 | 11/1984 | Yamamoto et al. ........... 364/474.06 |
| 4,490,946 | 1/1985 | Tsujiuchi et al. ............. 364/474.06 |
| 4,498,259 | 2/1985 | Yamamoto et al. ........... 364/474.06 |
| 4,751,647 | 6/1988 | Millay et al. ................ 364/474.06 |
| 4,791,575 | 12/1988 | Watts, Jr. et al. ............ 318/569 X |
| 4,815,000 | 3/1989 | Yoneda et al. ................ 364/474.34 |
| 4,848,038 | 7/1989 | Maruyama et al. ............ 364/474.06 |
| 4,884,373 | 12/1989 | Suzuki et al. ................. 364/474.06 |
| 4,956,946 | 9/1990 | Tsujiuchi et al. ............. 51/165.71 |
| 4,963,805 | 10/1990 | Suzuki et al. ................. 364/474.06 |

FOREIGN PATENT DOCUMENTS 52-133198  3/1977  Japan .
52-144895  5/1977  Japan .

*Primary Examiner*—Jerry Smith
*Assistant Examiner*—Jim Trammell
*Attorney, Agent, or Firm*—Oblon, Spivak, McClelland, Maier & Neustadt

[57] ABSTRACT

When machining cams with the same profile data, finished shape errors tend to increase as the diameter of a grinding wheel decreases. In order to keep the finished shape errors within a tolerance, the profile data used for machining must be renewed with new profile data corresponding to the present diameter of the grinding wheel. In the disclosed numerically controlled cam grinding machine, optimum wheel diameters, at which new profile data must be calculated, are decided automatically. The numerical controller calculates the marginal diameters which require renewal of profile data based upon the machining tolerance when a new grinding wheel is attached to the wheel head. After that, the numerical controller calculates new profile data from the marginal wheel diameter and lift data, when the present wheel diameter reaches into one of the marginal wheel diameters. The old profile data is renewed with the newly calculated profile data corresponding to the marginal wheel diameter.

5 Claims, 11 Drawing Sheets

- 300 Read Various Data
- 301 Read Machining Tolerance $\varepsilon$
- 302 Convert Flat Tappet Lift Data into Polar Coordinate Lift Data
- 303 Calculating Profile Data $P_0$
- 304 Transfer Profile Data $P_0$ to Main CPU
- 305 Calculating Marginal Wheel Diameters
- 306 Set First Marginal Diameter $SR_1$

NUMERICAL CONTROLLER FOR MACHINING A NON-CIRCULAR WORKPIECE AND CAPABLE OF CALCULATING PROFILE DATA

BACKGROUND OF THE INVENTION

The present invention relates to a numerical controller of a grinding machine for machining a non-circular workpiece such as a cam and the like.

In a conventional grinding machine of this kind, the position of a grinding wheel is controlled in synchronism with the rotation of a spindle in accordance with profile data which defines the relation between the rotational angle of the spindle and the position of the grinding wheel. The profile data is obtained as a changing component of the grinding wheel position which varies with respect to the rotational angle of the spindle. The changing component indicates a relative moving locus of the center axis of the grinding wheel when the grinding wheel makes a round tangentially to the periphery of the non-circular workpiece such as a cam and the like. When the wheel diameter decreases on account of wear, the changing component is varied, since the contact point between the wheel and the cam does not stay on the plane formed by the spindle and the rotary shaft of the wheel and changes depending on the wheel diameter as well as the rotational angle position of the workpiece. Accordingly, in order to accurately grind workpieces, the profile data must be, if the present wheel diameter is varied, recalculated from lift data and the present diameter of the grinding wheel. However, if the profile data is calculated whenever the wheel diameter decreases by a small amount, it is time consuming for machining and not realistic.

The present wheel diameter, in practice, reduces gradually by periodical wheel dressings. When the wheel diameter reduced by the wheel dressings reaches a marginal diameter whereat the finished shape error of the workpiece exceeds a tolerance if the profile data is not recalculated, the operator must give commands to the numerical controller to recalculate the profile data from the present diameter of the grinding wheel and lift data.

However, since the marginal diameter of the grinding wheel, at which the finished shape error of the workpiece exceeds a tolerance, changes depending upon the profile of the non-circular workpiece such as the cam and the present wheel diameter, the marginal diameter or the timing of recalculating of the profile data can hardly be determined uniformly.

Therefore, in the past, the timing of recalculating of the profile data has been decided by experience and intuition of the operator.

Accordingly, such problems are encountered that the machining cycle time increases on account of overdoing renewal of the profile data more than necessary, or conversely, the finished shape error of the workpiece may exceed the tolerance on account of delay of recalculation timing of the profile data.

SUMMARY OF THE INVENTION

It is, therefore, a primary object of the present invention to improve the machining accuracy of a non-circular workpiece.

It is another object of the present invention to reduce the machining cycle time of a non-circular workpiece.

It is a further object of the present invention to decide the timing of recalculating of profile data automatically to lighten a burden of the operator.

In order to attain the objects aforementioned, the present invention comprises, present wheel diameter memory means for storing the present wheel diameter, machining tolerance input means for inputting a machining tolerance related to a finished shape of the non-circular workpiece, wheel diameter calculating means for calculating the marginal wheel diameter which requires renewal of the profile data from the machining tolerance, profile data calculating means for calculating new profile data from the marginal wheel diameter and lift data, judging means for comparing the marginal wheel diameter and the present wheel diameter to judge whether the latter is larger than the marginal wheel diameter, and profile data renewing means for renewing the profile data used for machining with the new profile data corresponding to the marginal wheel diameter, when the present wheel diameter reaches the marginal wheel diameter.

Since the profile data is calculated with a standard wheel diameter, the workpiece can be machined most precisely with the grinding wheel having the standard wheel diameter. When machining with the same data, finished shape errors of the workpiece, however, increase as the wheel diameter decreases. In order to keep the finished shape errors within a predetermined machining tolerance, the profile data must be calculated again when the wheel diameter reaches a marginal wheel diameter which is smaller by a constant rate than the standard wheel diameter from which the profile data was calculated. When the actual wheel diameter becomes smaller than the marginal wheel diameter, a predetermined finished shape accuracy can no longer be obtained if the same profile data is used for machining. In the present invention, the marginal wheel diameter is calculated by the wheel diameter calculating means. Then, the profile data corresponding to the marginal wheel diameter is calculated by the profile data calculating means. When the actual wheel diameter becomes smaller than the marginal wheel diameter, the profile data used for machining is renewed with new profile data corresponding to the marginal wheel diameter. Thus, after renewal of the profile data, since it is machined according to the new profile data until the wheel diameter reaches the next marginal wheel diameter, the finished shape error is reduced.

It is the other feature of the present invention that the judging means is designed to judge whether the wheel diameter is larger than the marginal wheel diameter at every dressing of the grinding wheel.

Still another feature of the present invention is that the wheel diameter calculating means for calculating the marginal wheel diameter comprises, error calculating means for calculating a finished shape error of the workpiece when it is ground with the grinding wheel having the minimum wheel diameter, using the profile data corresponding to the maximum wheel diameter, and another finished shape error of the workpiece when it is ground with the grinding wheel having the medium wheel diameter between the maximum and minimum wheel diameters, using the profile data corresponding to the maximum wheel diameter, means for obtaining the relationship between the finished shape errors and the wheel diameter at any wheel diameter, by quadratic function approximating the finished shape errors at these points of maximum, medium and minimum wheel diameters, and means for deciding the marginal wheel diameter from the quadratic function and the machining tolerance.

The marginal wheel diameter can be simply obtained by such a configuration.

DESCRIPTION OF THE INVENTION

In the following, the embodiment of the present invention will be described with reference to the drawings.

Figure 1:
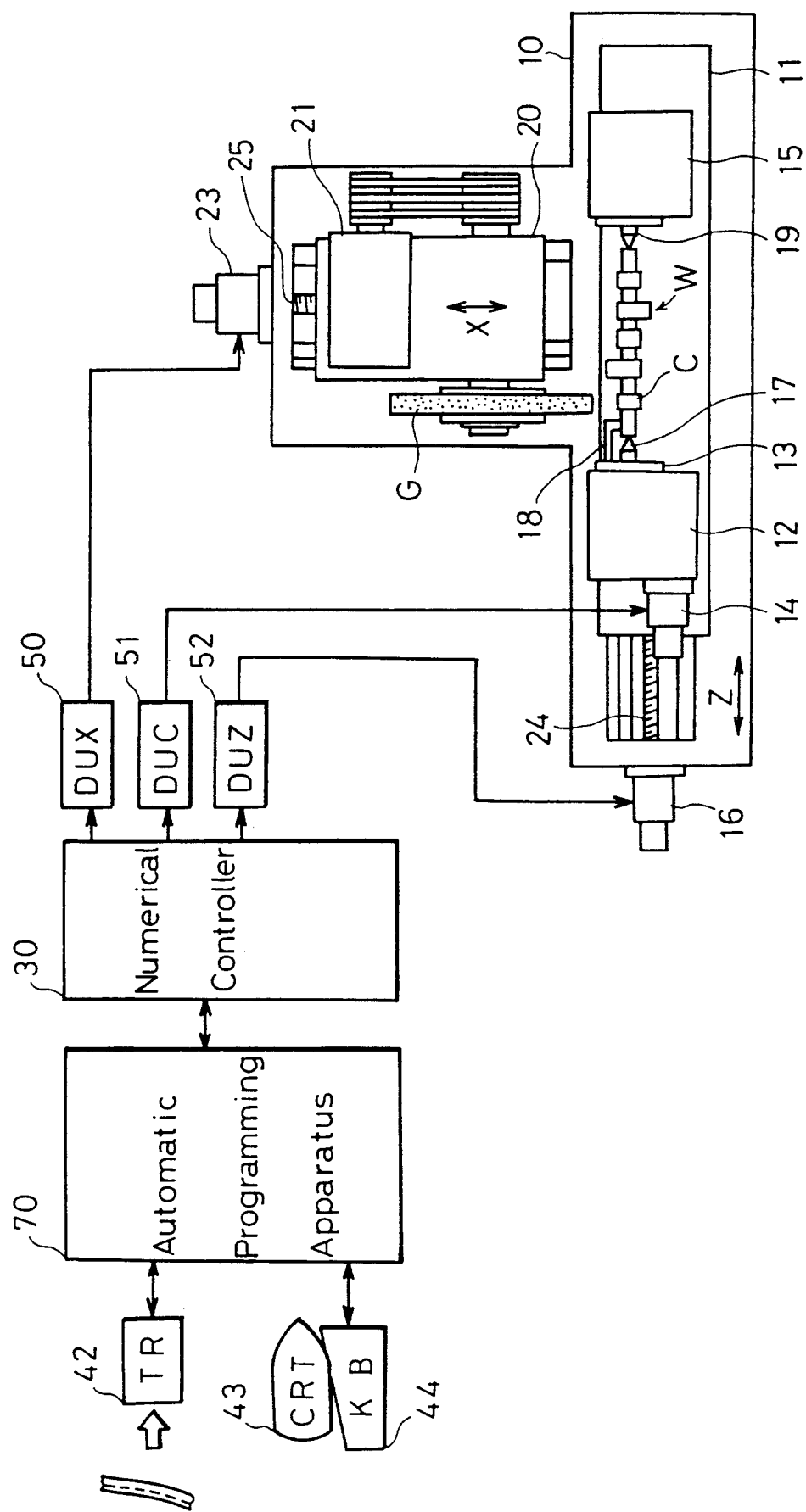
FIG. 1 is a general block diagram of a numerically controlled grinding machine showing the embodiment of the present invention.

FIG. 1 is a block diagram showing a numerically controlled grinding machine, in which the numeral 10 indicates a bed thereof, whereon a table 11 driven by a servo motor 16 via feed screw mechanism 24 is disposed slidably in the direction of the Z-axis. On the table 11, a head-stock 12 supporting a spindle 13 driven by a servo motor 14 is provided. On the right end of the table 11, a tail stock 15 is mounted, and a cam shaft as a workpiece W is clamped between a center 19 of the tail stock 15 and a center 17 of the spindle 13. The workpiece W is engaged to a positioning pin 18 projected from the spindle 13 to be locked in a phase of rotation to the spindle.

On the rear portion of the bed 10, a wheel head 20 which is movable back and forth toward the workpiece W is guided and provided with a grinding wheel G driven by a motor 21. The wheel head 20 is coupled to a servo motor 23 via a feed screw 25, and moved back and forth in the direction of the X-axis by the servo motor 23 rotating forward or reverse.

Drive units 50, 51 and 52 are circuits for receiving command pulses from a numerical controller 30 to drive the servo motors 23, 14 and 16 respectively.

Figure 2:
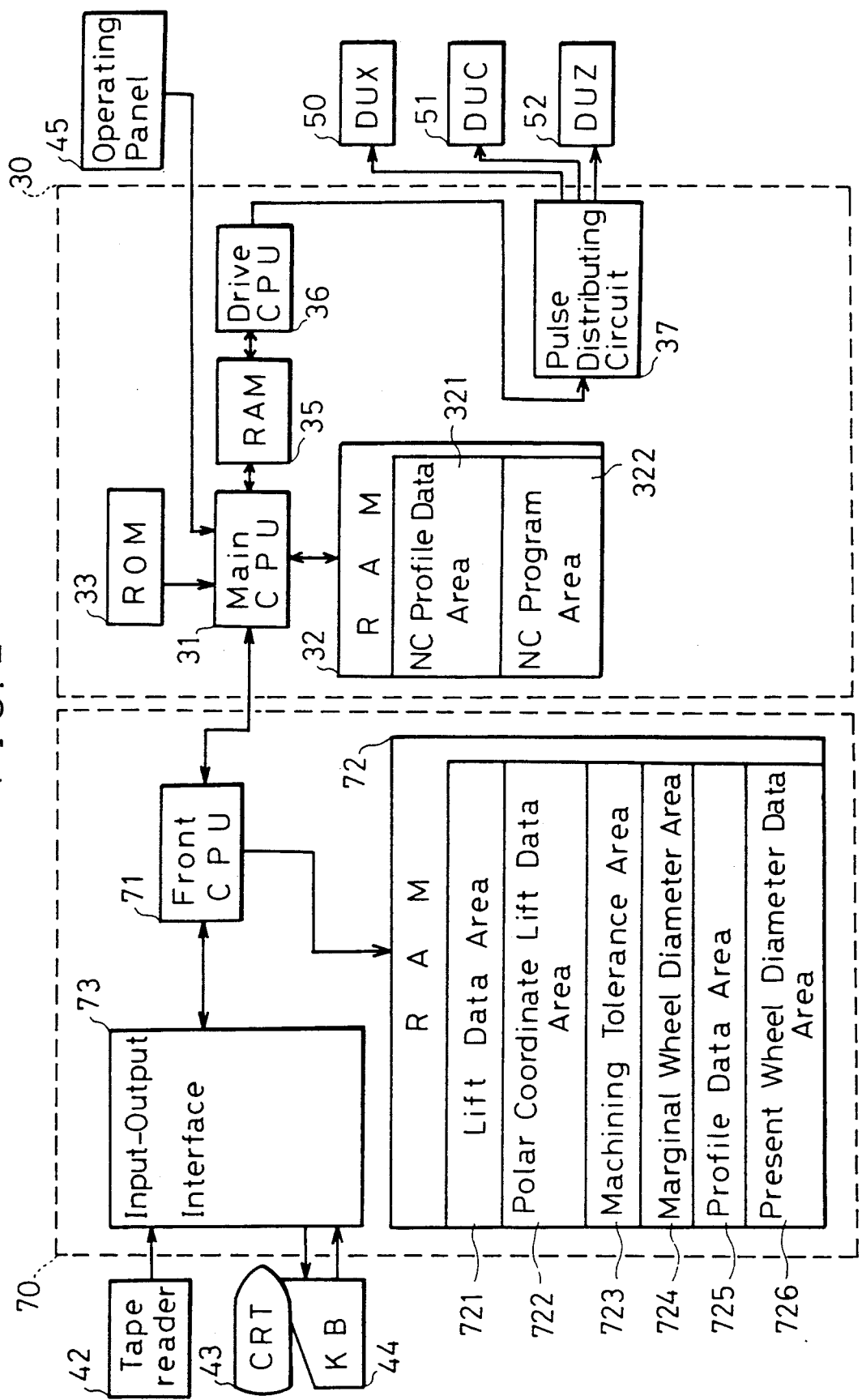
FIG. 2 is a block diagram for illustrating the configuration of a numerical controller shown in FIG. 1.

The numerical controller 30 mainly controls the rotation of the control axes numerically to control grinding of the workpiece W and dressing of the grinding wheel G. As shown in FIG. 2, the numerical controller 30 mainly comprises a main CPU 31 for controlling the grinding machine, a ROM 33 storing the control program and a RAM 32 for storing input data.

In the RAM 32, a machining NC profile data area 321 for storing the NC profile data and an NC program area 322 for storing the NC program for machining the workpiece, using the NC profile data stored in the NC profile data area 321, are formed.

In addition, in the numerical controller 30, a drive CPU 36, a RAM 35 and a pulse distributing circuit 37 are as a driving system for the servo motors 23, 14 and 16. The RAM 35 is a memory to which positioning data of the grinding wheel G, table 11 and spindle 13 are inputted from the main CPU 31.

The drive CPU 36 executes the process of the slow-up, slow-down and interpolation to the target point with respect to the control axes, and outputs positioning data of the interpolation point periodically, and the pulse distributing circuit 37 outputs operation command pulses to respective drive units 50, 51 and 52 in accordance with the positioning data output from the drive CPU 36.

The numeral 70 designates an automatic programming apparatus connected to the numerical controller 30 and automatically generates profile data $P_i$ from the polar coordinate lift data $L_0$ and the wheel diameter $R_i$.

The automatic programming apparatus 70 comprises a front CPU 71, a RAM 72 and an input-output interface 73. The RAM 72 has a lift data area 721 for storing the lift data of a plurality of workpieces, a polar coordinate lift data area 722 for storing the polar coordinate lift data $L_0$ converted from the lift data, a machining tolerance area 723 for storing a machining tolerance, a marginal wheel diameter area 724 for storing a marginal wheel diameter $SR_i$ upon which a renewal timing for the machining profile data is determined, a profile data area 725 for storing the profile data corresponding to the marginal wheel diameter $SR_i$, and a present wheel diameter memory data area 726 for storing the present wheel diameter $R_i$ transferred from the main CPU 31 to the front CPU 71 whenever the grinding wheel G is dressed at a predetermined cycle.

In the following, the operation of the present apparatus will be described.

Figure 3:
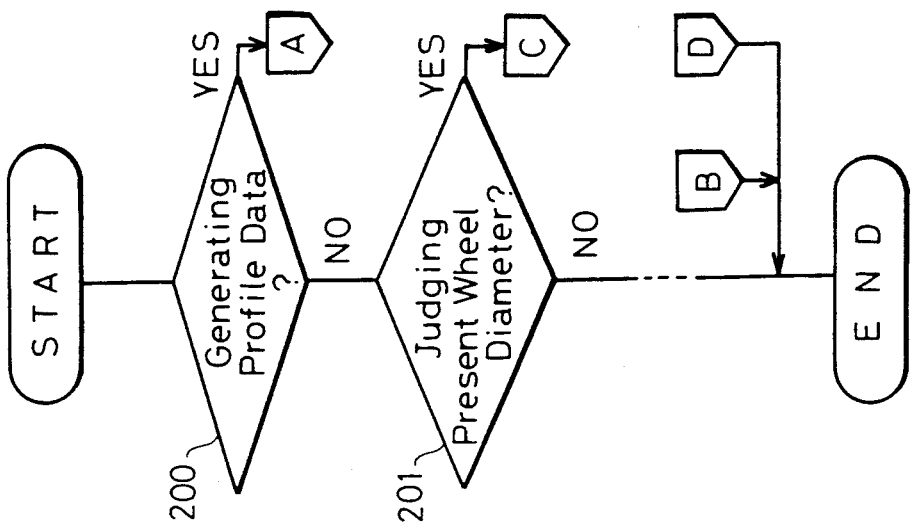

FIG. 3 shows a base routine program of the front CPU 71 which judges commands inputted from a keyboard 44 and the maine CPU 31, and branches to the various processing routines.

Figure 4:
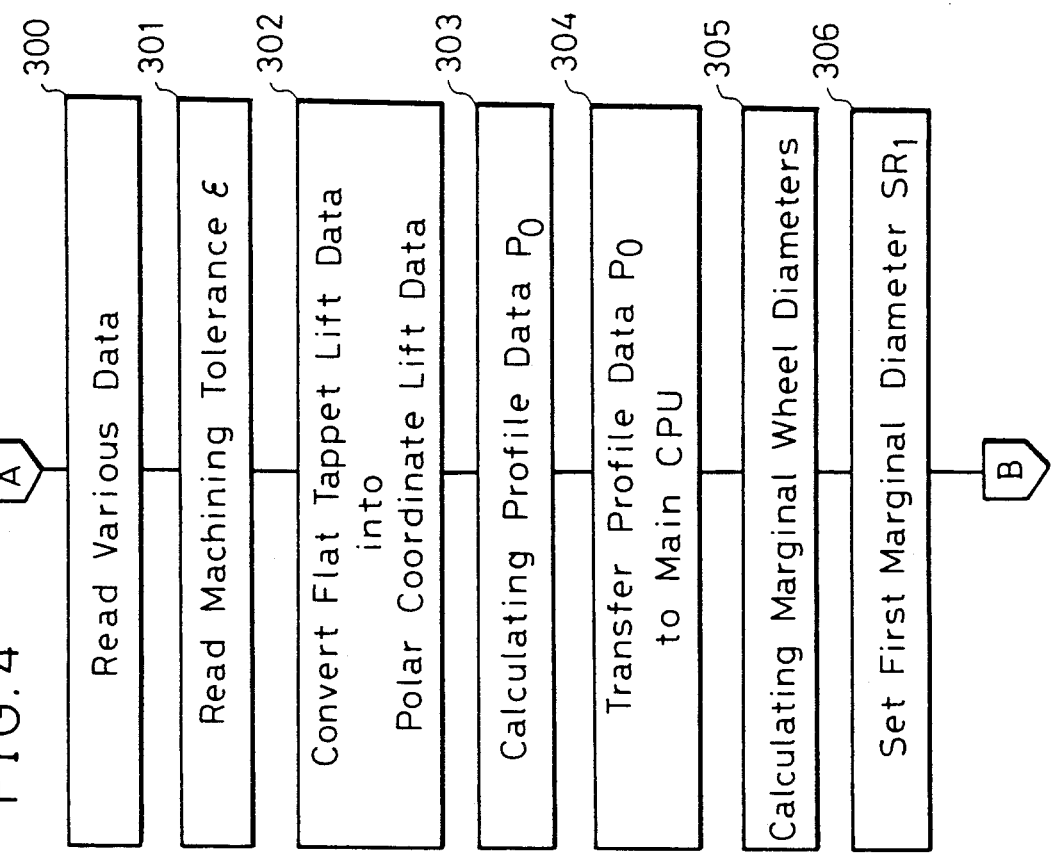
FIGS. 3, 4 and 5 are flow charts showing processing procedures of a front CPU shown in FIG. 2.

In Step 200 of FIG. 3, whether a command instructing a generation of the profile data $P_0$ is given from the keyboard by the operator or not is determined. When the command for the profile data generation is given, processings shown in FIG. 4 are executed by the front CPU 71.

FIrst, in Step 300, all flat tappet lift data necessary for machining are read from a tape reader 42 via the input-output interface 73 and stored in the lift data area 721. Also, various data such as the workpiece number, minimum wheel diameter Rmin and maximum wheel diameter Rmax as the initial value of the wheel diameter are read via tape reader 42 and the keyboard 44 and stored in a predetermined area in the ram 72. Then, in the next Step 301, the machining tolerance inputted from of the keyboard 44 by the operator is read and stored int he machining tolerance area 723.

Figure 10A:
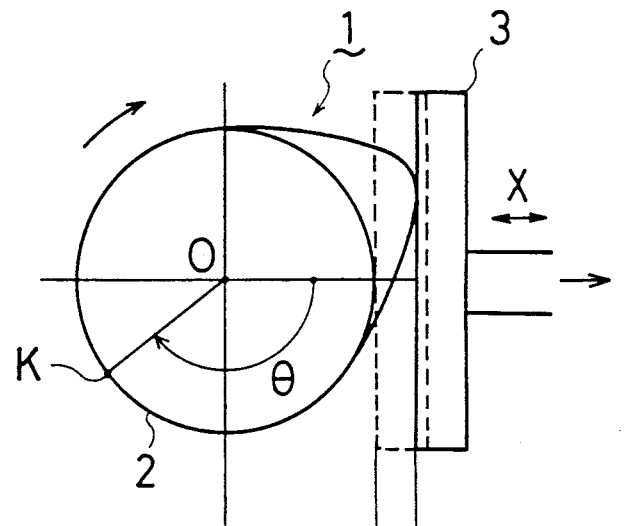
FIG. 10A is an explanatory chart for explaining a lift amount of a flat tappet relative to the rotational angle of a cam.
Figure 10B:
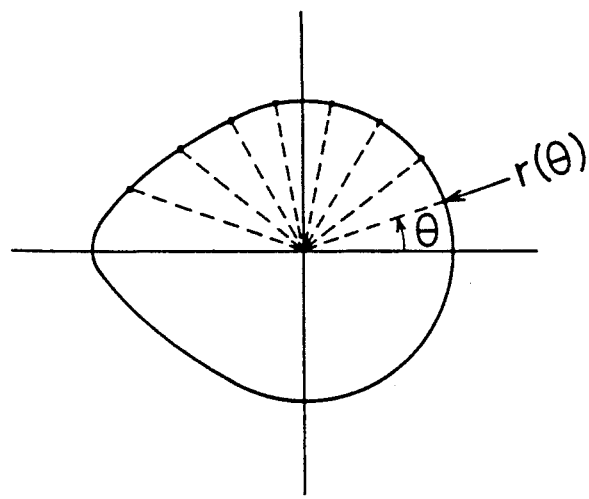
FIG. 10B is an explanatory chart for explaining polar coordinate lift data.

In Step 302, the flat tappet lift data corresponding to the number of the workpiece to be machined which has been designated by the operator, is read from the lift data area 721 and converted into the polar coordinate lift data $L_0$, which is stored in the polar coordinate lift data area 722. As shown in FIG. 10A, the flat tappet lift data is represented by a moving amount, i.e., a lift amount of the flat tappet 3 which is, when the cam 1 is rotated, contacted with the cam 1 and movable in the direction of the X-axis. Thus, if the rotational angle $\theta$ of the cam 1 is defined by the rotational angle of the reference point K on the base circle 2, the lift amount $\Delta X (\theta)$ is obtained as a function of $\theta$. The lift data to be input is given, for example, in point sequence of the lift amount $\Delta X (\theta)$ at every rotational angle of 0.5°. Since the contact position of the flat tappet 3 with the cam 1 varies responsive to the rotation of the cam 1, the lift data by the flat tappet is not given by the point sequence at every equicentral angle on the profile line of the cam 1. The flat tappet lift data, as shown in FIG. 10B, is converted into the polar coordinate lift data $L_0$ specifying the point sequence on the profile line of the cam 1 by the central angle $\theta$ and the length $r(\theta)$ of the radius vector with taking into account of the contact relation between the flat tappet 3 and the cam 1 as shown in FIG. 10A.

Figure 10C:
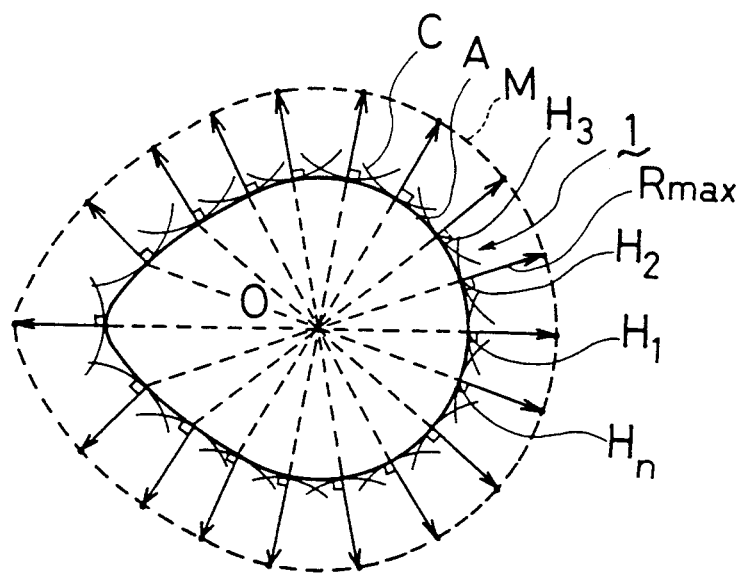
FIG. 10C is an explanatory chart for explaining a method for obtaining profile data.

Then, the CPU 31 moves its procedure to Step 303, wherein the profile data $P_0$ is calculated from the polar coordinate lift data $L_0$ and the maximum wheel diameter Rmax which is the initial wheel diameter. The profile data $P_0$ is obtained as shown in FIG. 10C. First, the polar coordinate lift data $L_0$ is smoothly interpolated to obtain the lift data at discrete points $H_1, H_2, \ldots H_n$ at every equicentral angle on the profile line of the cam 1. Then, a locus of the center M of circle C with radius Rmax (wheel diameter) contacting with the profile line A at the discrete points $H_1, H_2, \ldots H_n$ is obtained, and the profile data $P_0$ indicating the relative feed amount of the grinding wheel at every equicentral angle is obtained from the distance between the center M and the center O of the cam 1. The profile data $P_0$ is stored in the profile data area 725. Next, processings of the front CPU 71 are moved to Step 304, wherein the profile data $P_0$ is stored, as the initial profile data, in the NC profile data area 321 via the main CPU 31.

Then, in Step 305, the marginal wheel diameters $SR_1$, $SR_2$, $SR_3$ are calculated and stored in a predetermined area in the RAM 72, and in the following Step 306, the first marginal wheel diameter $SR_1$ is set in the marginal wheel diameter area 724 as the wheel diameter upon which the next renewal timing of the profile data is decided.

Figure 5:
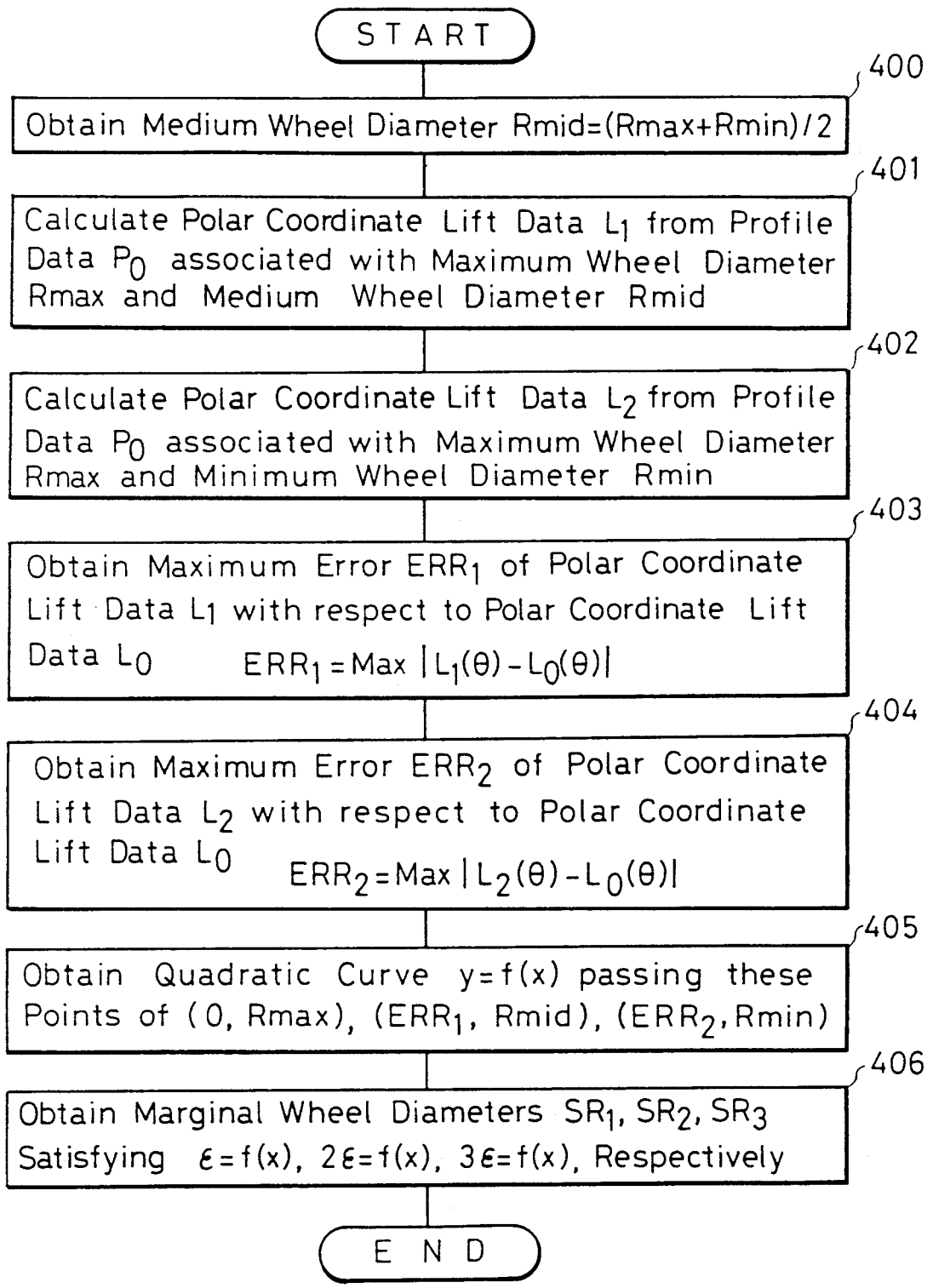

Calculating procedures of the marginal wheel diameter are particularly shown in FIG. 5.

In Step 400, the medium wheel diameter Rmid is calculated as a mean value between the minimum wheel diameter Rmin possible to grind at and the maximum wheel diameter Rmax as the initial value of the grinding wheel. Then, in Step 401, a polar coordinate lift data $L_1$ is calculated back from the profile data $P_0$ corresponding to the maximum wheel diameter Rmax and the medium wheel diameter Rmid. The polar coordinate lift data $L_1$ corresponds to the finished shape of the workpiece when the workpiece is ground with the grinding wheel of the medium wheel diameter Rmid using the profile data $P_0$. Next, in Step 402, a polar coordinate lift data $L_2$ is calculated back from the profile data $P_0$ corresponding to the maximum wheel diameter Rmax and the minimum wheel diameter Rmin. The polar coordinate lift data $L_2$ corresponds to the finished shape of the workpiece when the workpiece is ground with the grinding wheel of the minimum wheel diameter Rmin using the profile data $P_0$.

Figure 11:
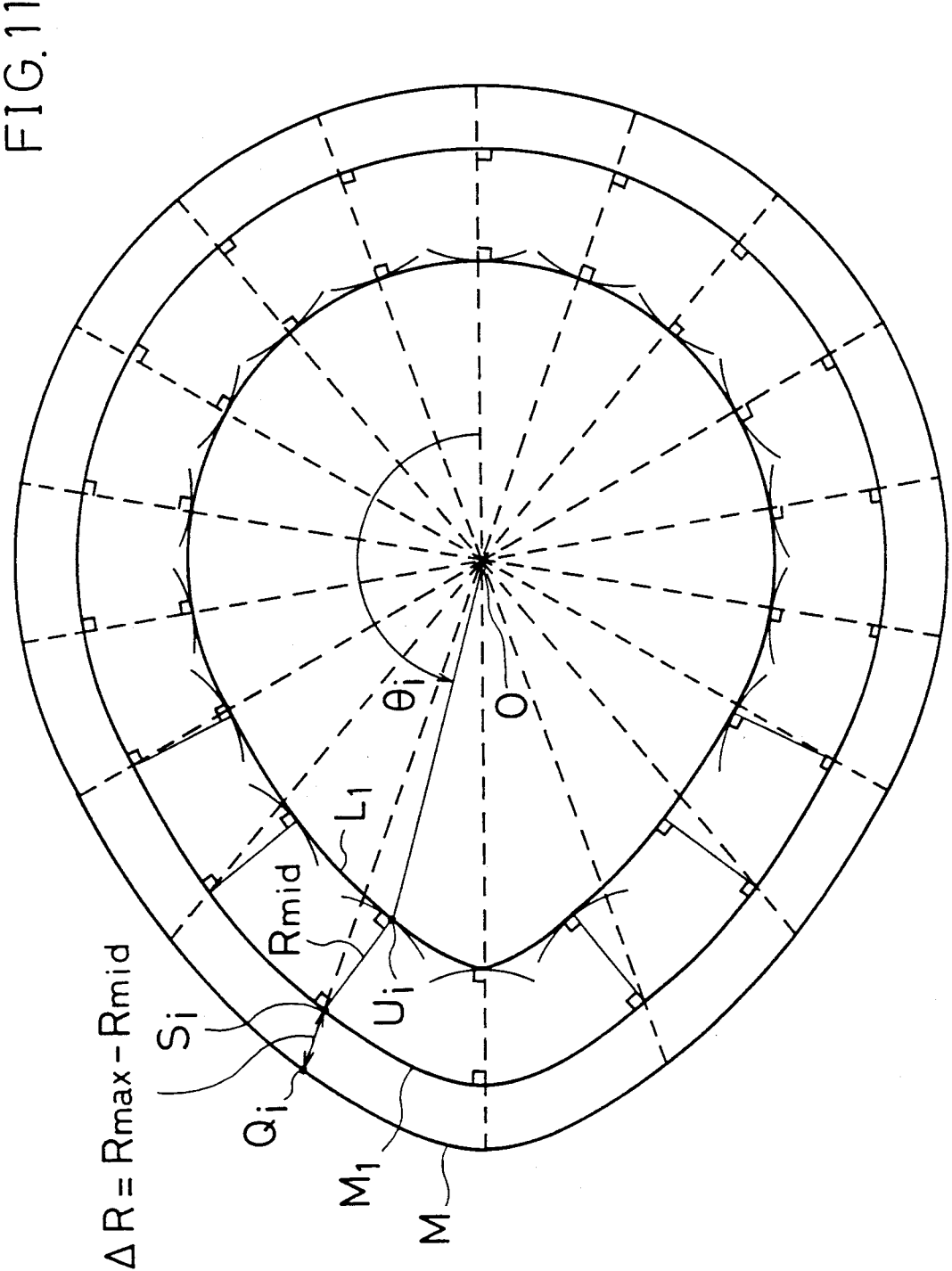
FIG. 11 is an explanatory chart for explaining a method for obtaining the finished shape at the medium wheel diameter.
Figure 12:
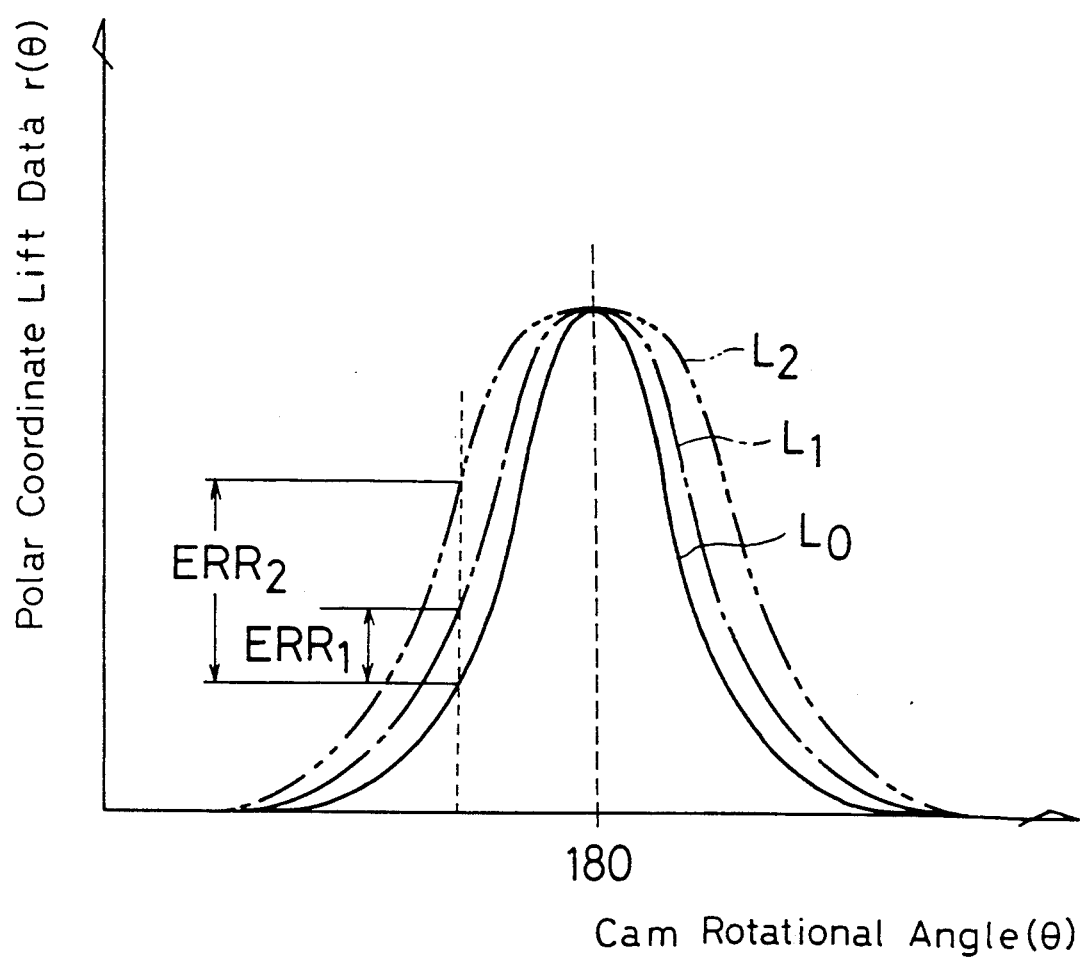
FIG. 12 is a characteristic chart showing polar coordinate lift data calculated back to by using the profile data associated with the maximum wheel diameter and the respective wheel diameters.

The polar coordinate lift data $L_1$ is obtained as shown in FIG. 11. First, a locus of grinding wheel center decided by the profile data $P_0$ related to the maximum wheel diameter Rmax is defined as M, and a locus of point $S_i$ obtained by moving an arbitrary point $Q_i$ on the locus M toward the spindle center O by the radial difference $\Delta R$ (=Rmax−Rmid) of the grinding wheel is defined as $M_1$. Then, point $U_i$ spaced toward the spindle by the medium wheel diameter Rmid in the direction normal to the locus $M_1$ from the arbitrary point $S_i$ on the locus $M_1$ is obtained. A locus drawn by the point $U_i$ is the finished shape from which the polar coordinate lift data $L_1$ is calculated. Similarly, for the minimum wheel diameter Rmin, the finished shape from which the polar coordinate lift data $L_2$ is calculated can be obtained in a same manner. The polar coordinate lift data $L_0$ corresponds to the maximum wheel diameter Rmax. Characteristics of these data $L_0$, $L_1$ and $L_2$ related to the cam rotational angle $\theta$ are shown in FIG. 12. It is recognized that deviation from the ideal finished shape corresponding to the polar coordinate lift data $L_0$ is larger as the wheel diameter reduces. As the wheel diameter reduces, a phase advance in an area from the base circle to the top and phase lag in an area from the top to the base circle tend to increase.

Next, in Step 403, a finished shape error $ERR_1$ is calculated from a maximum value of an absolute value of the difference between the polar coordinate lift data $L_1(\theta)$ and the polar coordinate lift data $L_0(\theta)$ with respect to the rotational angle of the cam. That is, the error $ERR_1$ is obtained from the following equation.

$$ERR_1 = Max. |L_1(\theta) - L_0(\theta)|$$

In a same manner, in Step 404, a finished shape error $ERR_2$ is calculated from a maximum value of an absolute value of the difference between the polar coordinate lift data $L_2(\theta)$ and the polar coordinate lift data $L_0(\theta)$ by using the following equation:

$$ERR_2 = Max. |L_2(\theta) - L_0(\theta)|$$

Figure 6:
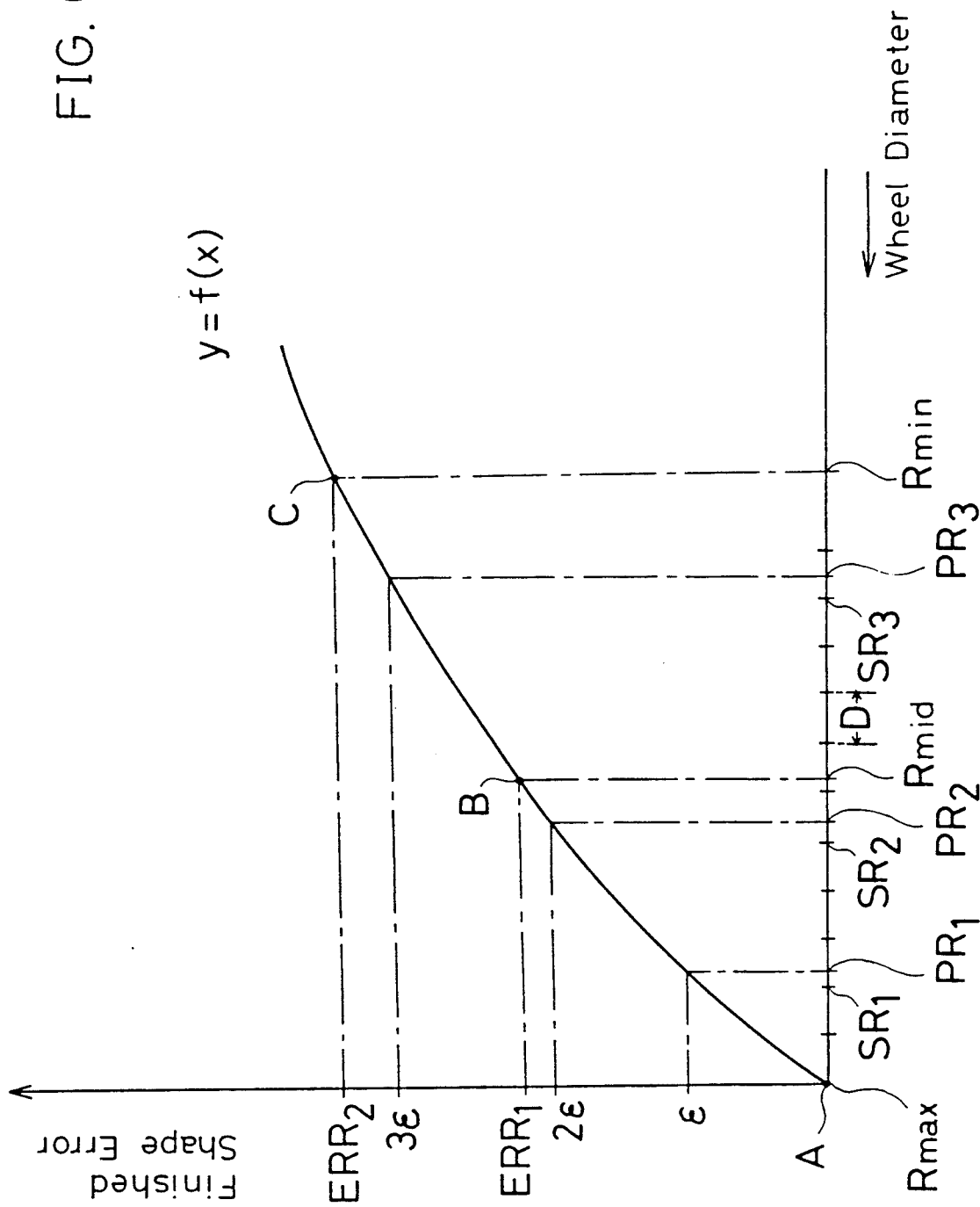
FIG. 6 is an explanatory chart showing a method for obtaining marginal wheel diameters.

Then, in Step 405, as shown in FIG. 6, on a coordinate plan in which the finished shape error is plotted along y-axis and the wheel diameter along x-axis, a quadratic function y=f(x) passing three points of A (maximum wheel diameter Rmax, error 0), B (medium wheel diameter Rmid, error $ERR_1$) and C (minimum wheel diameter Rmin, error $ERR_2$) is calculated.

In Step 406, then, the marginal diameters $SR_1$, $SR_2$ and $SR_3$ are calculated based upon the function y=f(x) and the machining tolerance $\epsilon$. Namely, three preliminary wheel diameters $PR_1$, $PR_2$ and $PR_3$ whereat the finished shape error reaches to $\epsilon$, $2\epsilon$ and $3\epsilon$, respectively, are first obtained. After that, wheel diameters, which are larger than the preliminary wheel diameter $PR_1$, $PR_2$ and $PR_3$, respectively and coincide with the nearest ones of discrete wheel diameters with a distance of the dressing allowance D of the grinding wheel, are serched as the marginal diameters $SR_1$, $SR_2$ and $SR_3$. And each of the marginal wheel diameters is used for determining the renewal timing of the profile data used for machining. In such a manner, the marginal wheel diameters are obtained all together.

In the following, the operation of the main CPU 31 at the time when machining command is input from an operating panel 45 will be described with reference to a flow-chart of FIG. 7.

In Step 500, a workpiece W is ground in accordance with a NC program stored in the NC program area 322. That is, together with feeding of the grinding wheel G commanded by the NC program, profile data in the NC profile data area 321 are commanded to be read, as a result, a cutting-in movement and a profile generating motion of the grinding wheel G are performed simultaneously and the workpiece is ground into a predetermined shape.

Then, the CPU 31 moves its procedures to Step 501 to determine whether the grinding wheel G has been dressed during or after machining according to the NC program. When the dressing has been performed, in next Step 502, a new present wheel diameter $R_i$ is obtained by subtracting the dressing allowance D from the present wheel diameter $R_i$. Then, in Step 503, the new present wheel diameter $R_i$ is transferred to the front CPU 71, and thereby stored in the present wheel diameter data area 726.

Next, in Step 504, the main CPU 31 commands the front CPU 71 to judge whether the machining error is within the tolerance $\epsilon$ if the workpiece W is machined with the grinding wheel having diameter $R_i$.

Figure 8:
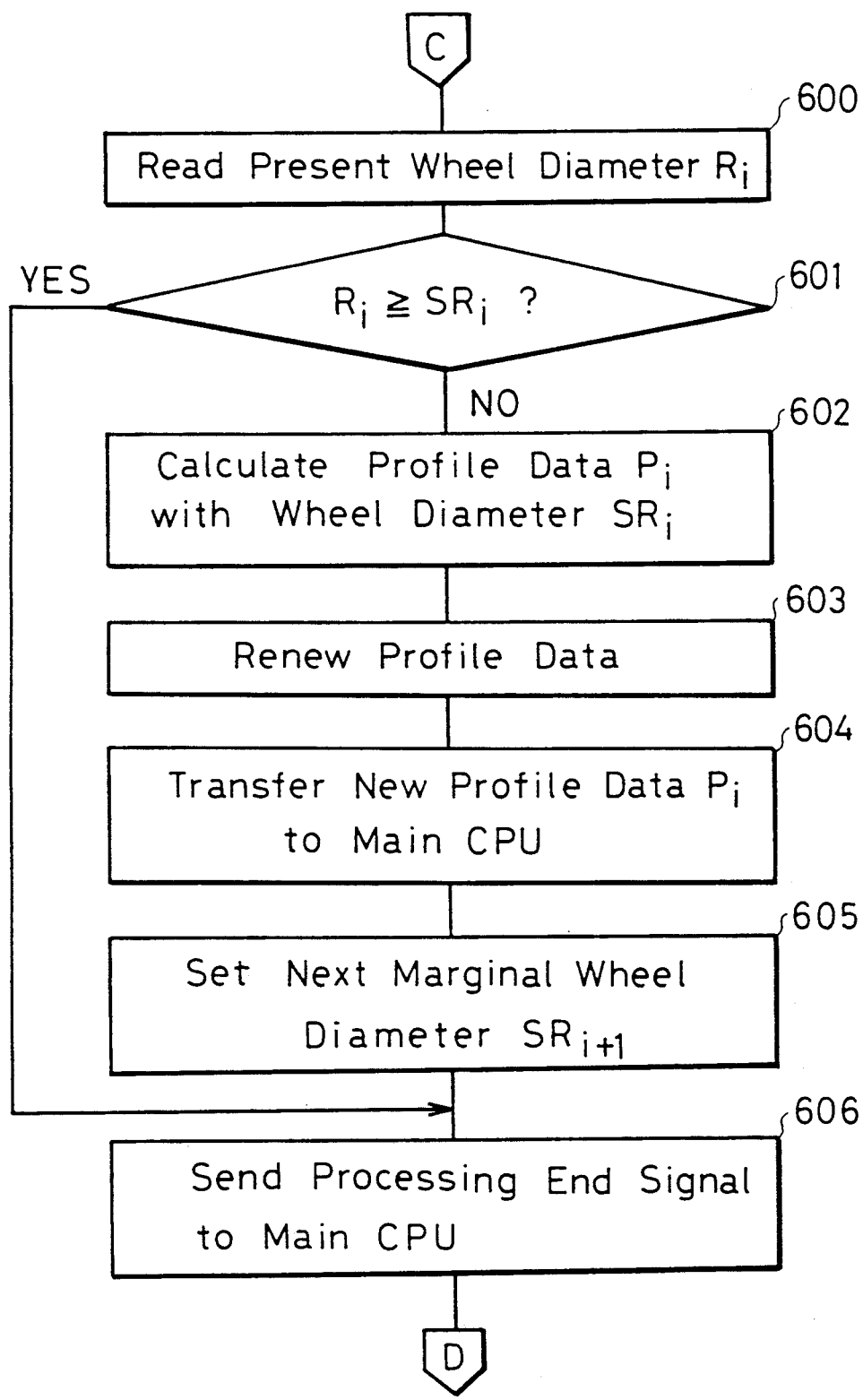
Figure 9:
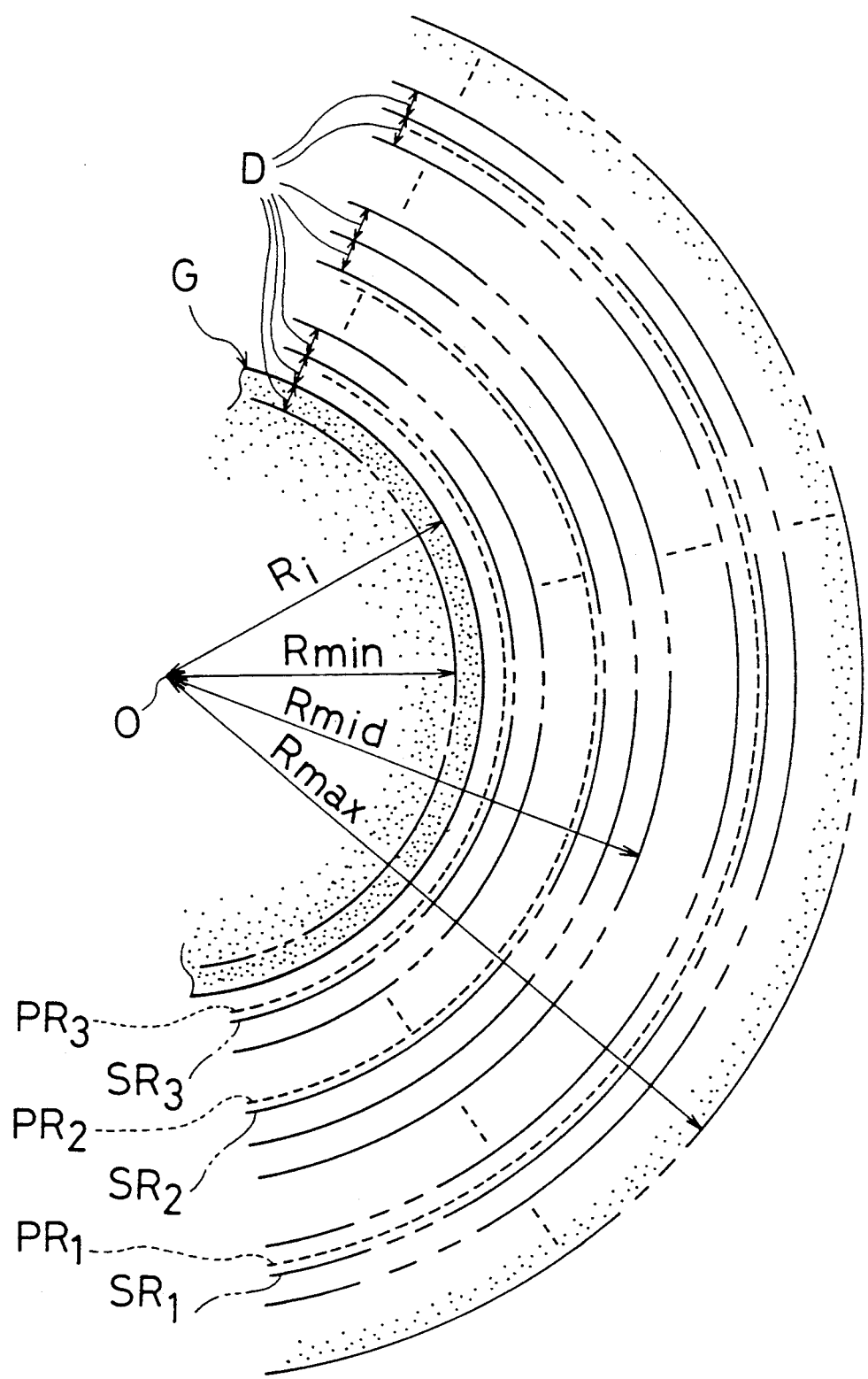
FIG. 9 is a plan view showing the relationship between the present and marginal wheel diameters.

When the command is input into the front CPU 71 by the main CPU 31, it is determined YES in Step 201 shown in FIG. 3, and the front CPU 71 executes a program of FIG. 8.

In FIG. 8, in Step 600, the present wheel diameter $R_i$ transferred from the main CPU 31 and stored in the present wheel diameter data area 726 is read. Then, in Step 601, it is determined whether the present wheel diameter $R_i$ is not less than the marginal wheel diameter $SR_i$ (initially, the first marginal wheel diameter $SR_i$ is stored) stored in the marginal wheel diameter area 724. When it is YES, since the profile data is not necessary to be recalculated, the procedure is moved to Step 606 and a processing end signal is output to the CPU 31 to complete the program.

While, when it is determined NO in Step 601, that is, when the present wheel diameter $R_i$ becomes less than the marginal wheel diameter $SR_i$, the CPU 31 moves its procedure to Step 602 to calculate the profile data $P_i$ with the marginal wheel diameter $SR_i$ and the polar coordinate lift data $L_0$. Then, in Step 603, the profile data area 725 is rewritten with the profile data newly calculated in Step 602.

In the succeeding Step 604, new profile data $P_i$ stored in the profile data area 725 is transferred to the main CPU 31 via the front CPU 71 and stored in the NC profile data area 321. In the following Step 605, the next marginal wheel diameter $SR_{i+1}$ is stored in the marginal wheel diameter area 724. For example, when the marginal wheel diameter $SR_i$ to have been set is $SR_1$, the marginal wheel diameter $SR_{i+1}$ to be set next becomes $SR_2$, and in the next Step 606, the processing end signal is outputted to the main CPU 31 to complete the program.

In such a manner, whenever the present wheel diameter $R_i$ reduces to the set marginal wheel diameter $SR_i$ ($SR_1$, $SR_2$, $SR_3$), the profile data $P_i$ is newly calculated and the profile data used for machining is renewed into new profile data $P_i$ which produces no machining errors.

Figure 7:
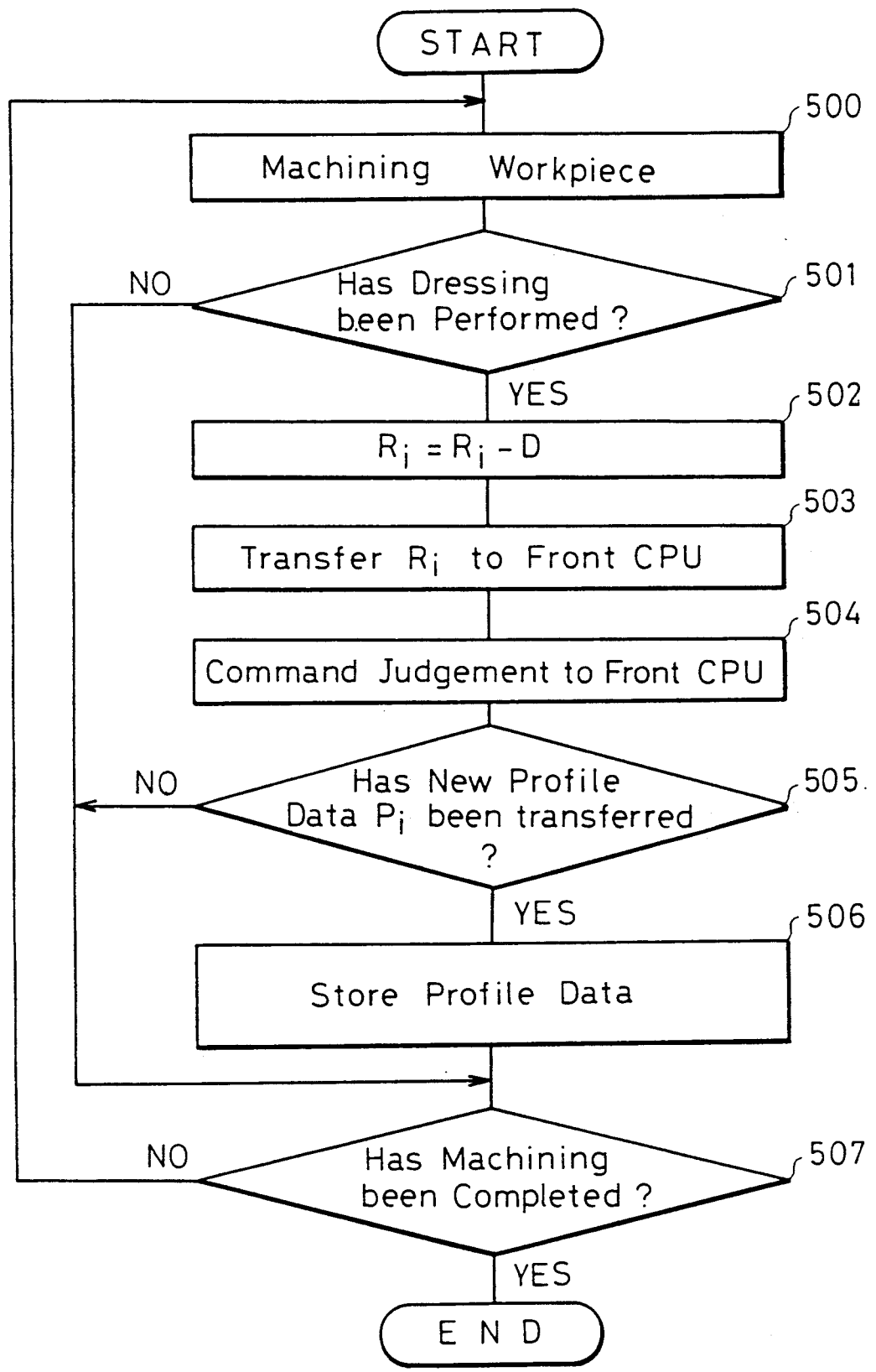
FIGS. 7 and 8 are flow charts showing processing procedures of a main CPU shown in FIG. 2.

When the processing end signal is outputted to the main CPU 31, processings of which are continued from Step 505, of FIG. 7. In Step 505, it is determined whether new profile data $P_i$ has been transferred. If it is determined YES, the procedure is moved to next Step 506, wherein the transferred profile data $P_i$ is stored in the NC profile data area 321 to renew profile data used for machining. Then, in Step 507, it is determined whether all of the machining is completed, if the result is YES, the program is completed, and if the result is NO, processings of the main CPU 31 return again to the aforesaid Step 500.

In the description aforementioned, for the purpose of simplifying the description, though it has described that whenever the present wheel diameter $R_i$ reduces to the set marginal wheel diameter $SR_i$ ($SR_1$, $SR_2$, $SR_3$), profile data corresponding to the marginal wheel diameter is recalculated, in practice, for example, while the workpiece is machined with the profile data $P_0$ corresponding to the maximum wheel diameter Rmax, the next profile data $P_1$ related to the first marginal wheel diameter $SR_1$ is calculated and stored in the profile data area 725. Thus, when the present wheel diameter $R_i$ has been become less than the marginal wheel diameter $SR_1$, the profile data used for machining are adapted to be renewed merely by transferring the profile data stored in the profile data area 725 to the NC profile data area 321. In such a manner, in practice, the recalculating time of the profile data is prevented from delaying the machining cycle time.

In the embodiment described above, when the marginal wheel diameter $SR_1$, $SR_2$, $SR_3$ are obtained, they are obtained all together by calculating the wheel diameters at which the finished shape errors are brought to multiples of the machining tolerance $\epsilon$, from the quadratic function which approximates the relationship between the finished shape error and wheel diameter, passing through the three-point value of maximum finished shape errors to be caused if workpiece is machined with the grinding wheel having the maximum Rmax, medium Rmid and minimum Rmin wheel diameters, respectively, using the profile data $P_0$ corresponding to the maximum wheel diameter Rmax. However, for example, when the second marginal wheel diameter $SR_2$ is obtained, it may be obtained by calculating the wheel diameter at which the finished shape error is brought to the machining tolerance $\epsilon$, from a quadratic function which approximates the relationship between the finished shape error and wheel diameter, passing through the three-point value of the finished shape errors to be caused if the workpiece is machined with the grinding wheel having the first marginal wheel diameter $SR_1$, medium wheel diameter Rmid and minimum wheel diameter Rmin, respectively, using the profile data $P_1$ related to the first marginal wheel diameter $SR_1$, by defining the mean value between the first marginal wheel diameter $SR_1$ and the minimum wheel diameter Rmin as the new medium wheel diameter Rmid.

The third marginal wheel diameter $SR_3$ can also be obtained similarly. That is, when obtaining the next marginal wheel diameter, profile data presently used are used to obtain the finished shape errors.

In such a manner, errors can be evaluated more accurately and the timing of renewal of the profile data can be more suitable.

The method of interpolation of errors is not limited to quadratic functional interpolation aforementioned.

As described heretofore, in the present invention, the workpiece can be machined without renewing the profile data for machining until the machining error becomes larger than a predetermined tolerance, so that the cycle time can be shortened on account of no wastefull recalculating of the profile data.

Moreover, as the workpiece is machined within the machining tolerance, machining accuracy of the workpiece after machining can be kept constant within the tolerance.

What is claimed is:

1. A numerical controller capable of calculating profile data defining a relationship between a rotational angle of a spindle and a position of a tool feed axis, based upon lift data specifying a desired shape of a non-circular workpiece and a wheel diameter of a grinding wheel, in order to control machining of said non-circular workpiece in accordance with said calculated profile data, said controller comprising:

present wheel diameter memory means for storing said present wheel diameter of said grinding wheel;

machining tolerance input means for inputting a machining tolerance related to a finished shape of said non-circular workpiece;

finished shape error calculating means for calculating respective finished shape errors corresponding to different diameters of said grinding wheel, said respective finished shape errors indicating respective difference between said desired shape and respective theoretical finished shapes which would be obtained by machinings with grinding wheels having said different diameters using said profile data common to said different diameters, said respective theoretical finished shapes being calculated from either one of said desired shape or said profile data and said respective different diameters;

marginal wheel diameter calculating means for calculating a function representing a relationship between said different diameters and said corresponding finished shape errors to calculate a marginal diameter requiring renewal of said profile data from said function and said machining tolerance;

profile data calculating means for calculating new profile data from a locus of a center of said grinding wheel which is calculated from said desired shape and said marginal wheel diameter;

judging means for comparing said marginal wheel diameter and said present wheel diameter to judge whether said present wheel diameter is larger than said marginal wheel diameter or not; and profile data renewing means for renewing said profile data used for machining, when said present wheel diameter reaches said marginal wheel diameter, with said new profile data corresponding to said marginal wheel diameter.

2. A numerical controller according to claim 1, wherein said finished shape error calculating means calculates a first finished shape error indicating a difference between said desired shape and a theoretical first finished shape which would be obtained by a machining with a grinding wheel having a minimum wheel diameter using a reference profile data corresponding to a maximum wheel diameter, and a second finished shape error indicating a difference between said desired shape and a theoretical second finished shape which would be obtained by a machining with a grinding wheel having a medium wheel diameter between said minimum wheel diameter and said maximum wheel diameter using said reference profile data; and said marginal wheel diameter calculating means obtains a quadratic function representing a relationship between said different diameters and said corresponding finished shape errors based upon said first and second finished shape errors and said minimum and medium wheel diameters to calculate said marginal wheel diameters from said quadratic function and said machining tolerance.

3. A numerical controller capable of calculating profile data defining a relationship between a rotational angle of a spindle and a position of a tool feed axis, based upon lift data specifying a desired shape of a non-circular workpiece and a wheel diameter of a grinding wheel, in order to control machining of said non-circular workpiece in accordance with said calculated profile data, said controller comprising:

present wheel diameter memory means for storing the present wheel diameter of said grinding wheel;

machining tolerance input means for inputting a machining tolerance related to a finished shape of said non-circular workpiece;

finished shape error calculating means for calculating a finished shape error indicating a difference between said desired shape and a theoretical finished shape which would be obtained by a machining using said profile data with said grinding wheel having a diameter smaller than a reference diameter used in calculation of said profile data, said theoretical finished shape being calculated from either one of said desired shape or said profile data and said diameter;

marginal wheel diameter calculating means for calculating a marginal wheel diameter at which said finished shape error exceeds a predetermined value corresponding to said machining tolerance;

profile data calculating means for calculating new profile data from a locus of a center of said grinding wheel which is calculated from said desired shape and said marginal wheel diameter;

judging means for comparing said marginal wheel diameter and said present wheel diameter to judge whether said present wheel diameter is larger than said marginal wheel diameter or not; and profile data renewing means for renewing said profile data used for machining, when said present wheel diameter reaches said marginal wheel diameter, with said new profile data corresponding to said marginal wheel diameter.

4. A numerical controller according to claim 3, wherein said judging means judges whether said present wheel diameter is larger than said marginal wheel diameter whenever said grinding wheel is dressed.

5. A method of calculating profile data defining a relationship between a rotational angle of a spindle and a position of a tool feed axis, based upon lift data specifying a desired shape of a non-circular workpiece and a wheel diameter of a grinding wheel, in order to control machining of said non-circular workpiece in accordance with said calculated profile data, said method comprising the steps of:

calculating a finished shape error indicating a difference between said desired shape and a theoretical finished shape which would be obtained by a machining using said profile data with said grinding wheel having a diameter smaller than a reference diameter used in calculation of said profile data, said theoretical finished shape being calculated from either one of said desired shape or said profile data and said diameter;

calculating a marginal wheel diameter at which said finished shape error exceeds a predetermined value corresponding to said machining tolerance;

calculating new profile data from a locus of a center of said grinding wheel which is calculated from said desired shape and said marginal wheel diameter;

comparing said marginal wheel diameter and a present wheel diameter to judge whether said present wheel diameter of said grinding wheel is larger than said marginal wheel diameter or not; and renewing said profile data used for machining, when said present wheel diameter reaches said marginal wheel diameter, with said new profile data corresponding to said marginal wheel diameter.

* * * * *